United States Patent

Kaye

[15] 3,664,991

[45] May 23, 1972

[54] VINYL-SUBSTITUTED PYRIMIDINES AND PURINES AND POLYMERS THEREOF

[72] Inventor: Howard Kaye, College Station, Tex.
[73] Assignee: Research Corporation, New York, N.Y.
[22] Filed: Dec. 2, 1969
[21] Appl. No.: 881,595

[52] U.S. Cl..................260/29.6 HN, 260/88.3, 260/211.5, 260/252, 424/251
[51] Int. Cl. .............................................C08f 7/12
[58] Field of Search................260/88.3, 29.6 HN

[56] References Cited

UNITED STATES PATENTS 2,623,879  12/1952  Ringwald et al.................260/88.3 R

*Primary Examiner*—Harry Wong, Jr.
*Attorney*—Robert S. Dunham, P. E. Henninger, Lester W. Clark, Gerald W. Griffin, Thomas F. Moran, Howard J. Churchill, R. Bradlee Boal, Christopher C. Dunham and Robert Scobey

[57] ABSTRACT

Vinyl-substituted organic bases, particularly vinyl-substituted purines and vinyl-substituted pyrimidines and polymers thereof have been prepared. 1-vinyluracil was prepared by two methods. By one method 1,(2-chloroethyl) uracil was prepared by reacting bis (trimethylsilyl) uracil with 1,2-dichloroethane and then dehydrohalogenated. By the other method, B-ethoxy acryloyl chloride was converted into B-ethoxy acrylamide by treatment with ammonia. Vinylisocyanate was then heated with B-ethoxy acrylamide in a sealed tube to give N,B-ethoxy acryl-N-vinyl urea which was then cyclized to 1-vinyluracil. 9-vinyladenine was prepared directly by vinyl interchange of vinyl acetate with adenine. A superior vinyl interchange procedure was developed. This procedure involves first protecting the 6-amino group with a benzoyl group. Each of the monomers, i.e. 1-vinyluracil and 9-vinyladenine, were polymerized in an aqueous solution by free radical catalysis and the resulting polymers exhibited good thermal properties and were capable of being cast into films.

7 Claims, No Drawings

VINYL-SUBSTITUTED PYRIMIDINES AND PURINES AND POLYMERS THEREOF

This invention relates to vinyl-substituted organic bases, particularly vinyl-substituted purines and vinyl-substituted pyrimidines. In accordance with one embodiment this invention relates to the preparation of 9-vinyladenine and the preparation of a polymer thereof, viz. poly-9-vinyladenine.

In accordance with another embodiment this invention is directed to the preparation of 1-vinyl-uracil and the preparation of a polymer thereof, viz. poly-1-vinyluracil.

It is an object of this invention to provide new chemicals particularly new polymeric materials.

Another object of this invention is to provide a method for the preparation of vinyl-substituted purines such as adenine, particularly purines which could form Watson-Crick base pairs, e.g. guanine, xanthine, hypoxanthine, uric acid and adenines substituted at the 2, 6 and 8 positions.

Still another object of this invention is to provide improved processes for the manufacture of vinyl-substituted organic bases, such as an improved process for the preparation of 1-vinyluracil and an improved process for the preparation of 9-vinyladenine.

How these and other objects of this invention are achieved will become apparent in the light of the accompanying disclosure. In at least one embodiment of the practice of this invention at least one of the foregoing objects will be achieved.

The preparation of vinyl-substituted organic bases, particularly the vinyl-substituted pyrimidines and purines, e.g. vinyl-substituted uracil and vinyl-substituted adenine, is of interest particularly since these bases, uracil and adenine, are constituents of nucleotides and nucleosides and are therefore of interest from a pharmacological and/or biological point of view. Vinyl-substituted purines that can form Watson-Crick base pairs such as adenine, guanine, xanthine, hypoxanthine, uric acid and adenines substituted at the 2, 6 and 8 positions are of particular interest. Of special interest from a pharmacological and/or biological point of view would be the polymers of these materials, such as poly-9-vinyladenine and poly-1-vinyluracil.

This invention is directed to vinyl-substituted pyrimidines and purines, such as vinyl-substituted uracil, vinyl-substituted thymine, vinyl-substituted cytosine, vinyl-substituted 5-hydroxymethyluracil and vinyl-substituted 5-hydroxymethylcytosine, all examples of vinyl-substituted pyrimidines. Of interest also are the vinyl-substituted purines, such as vinyl-substituted adenine, vinyl-substituted guanine, vinyl-substituted isoguanine and vinyl-substituted methylisoguanine and the other above-mentioned vinyl-substituted purines. The polymers of the aforementioned vinyl-substituted pyrimidines and purines, particularly the bases capable of forming Watson-Crick base pairs, particularly poly-1-vinyluracil and poly-9-vinyladenine are of special interest.

The invention in one of its embodiments directed to vinyl-substituted purine, particularly vinyl-substituted adenine, viz. 9-vinyladenine and polymers thereof, is described hereinbelow.

9-vinyladenine was prepared by a modification of the general vinyl interchange procedure of Hopft et al., Helv. Chim. Acta, 43, 135 (1960). 9-vinyladenine was prepared by refluxing adenine I, vinyl acetate, mercuric acetate and an excess of sulfuric acid in dimethyl formamide. The resulting produce 9-vinyladenine II, melting point 198° C. (2 percent yield) was obtained after chromatography on silicic acid. The general equation and reaction mechanism is indicated by equation No. 1 hereinbelow:

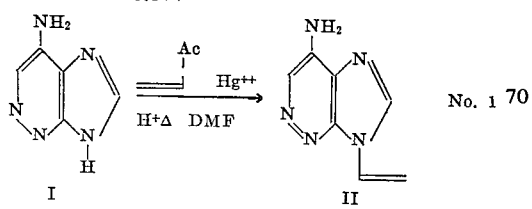

Another procedure for the preparation of 9-vinyl-adenine and not requiring chromatographic purification was developed. In this procedure the 6-amino group was first protected by a benzoyl group so that the adenine moiety would be more soluble in vinylacetate. After refluxing the 6-benzoyladenine III, see Weygand et al., Chem. Ber., 85, 256 (1952), in vinylacetate containing mercuric acetate and a catalytic amount of sulfuric acid, 6-benzoyl-9-vinyladenine IV, melting point 168°–170° C. (65 percent yield) was obtained. Treatment of this compound with methanolic ammonia afforded 9-vinyladenine II, melting point 198°–200° C. (70 percent yield), after two crystallizations in benzene. The above procedures for the preparation of 9-vinyladenine are reported by H. Kaye in Polymer Letters, Vol. 7, pp 1–5 (1969) in the article entitled Nucleic Acid Analogs. The Syntheses of Poly-1-Vinyluracil and Poly-9-Vinyladenine.

The general equation and reaction mechanism is indicated by equation No. 2 hereinbelow:

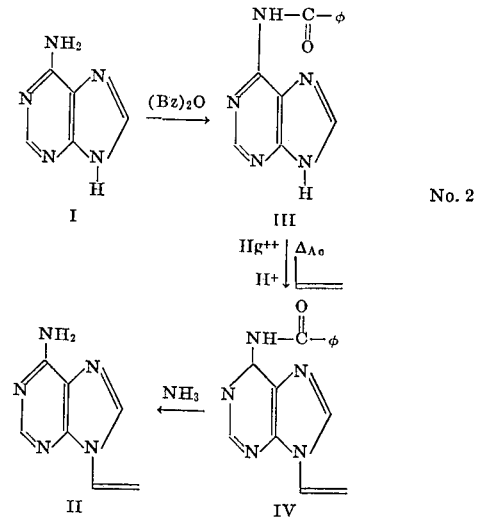

The preparation of other purine derivatives vinylated in the 9 position by vinylacetate interchange has also been reported, see Pitha et al., J. Org. Chem., 33, 1341 (1968).

Poly-9-vinyladenine was obtained by potassium persulfate initiated polymerization of 9-vinyladenine in water at 90° C. in a sealed tube under nitrogen. The polymer was obtained as a white solid in 89 percent yield by precipitation with methanol. The polymer analyzed on the basis calculated for $(C_7H_7N_5)_n$: C, 52.05 percent, H, 5.10 percent, N, 42.86 percent and possessed a molecular weight of about >30,000. Polymers having a molecular weight in the range 3000–200,000 wherein the n aforesaid is >20 are obtainable in the practice of this invention.

In the polymerization of 9-vinyladenine the monomer concentration in water should not be much greater than about 1 percent, otherwise low yields and low molecular weight materials result. Poly-9-vinyladenine was prepared from a 1 percent solution of 9-vinyladenine in distilled water deaerated with nitrogen. Potassium persulfate in the amount 0.5 mole percent was then added and the polymerization tube sealed and heated at 95°–100° C for an extended period, about 4 days. The cooled solution was then poured into a large excess of methanol and poly-9-vinyladenine precipitated in 89 percent yield. It was observed that when the polymerization operation was carried out for shorter time periods, lower yield of polymer resulted.

The poly-9-vinyladenine was found to be soluble in water and the percent hypochromism in water was found to be 42 percent, suggesting the existence of some base stacking. In comparison, polyadenylic acid which is thought to have some ordered structure at neutral pH exhibits about 35 percent hypochromism. Poly-9-vinyladenine can be cast into a clear transparent brittle film from water. Differential thermal analysis under nitrogen indicated a glass transition temperature at 300° but the polymer was infusible.

The properties and usefulness of the poly-9-vinyl-adenine as a coating material are indicated by the following. The polymer, which is soluble in water, can be cast into transparent films which adheres to glass. The polymer is insoluble in common organic solvents, exhibits a high glass transition temperature at 300° C, is infusible (does not melt) and possesses high thermal stability to 375° C.

Poly-9-vinyladenine interacts with biologically important polymers. It can form various multi-stranded complexes with polyuridylic acid (poly U) and it would appear that poly-9-vinyladenine and its complexes with poly U would be pharmacologically active. A novel feature indicative of interesting pharmacological and/or biological activity is the fact that the polymer cannot be degraded by enzymes in the body.

Continuous variation mixing experiments with the polyuridylic acid (poly U) as studied by ultraviolet hypochromism at 255 mu indicates that in 0.001 M Na$^+$, pH 7.0 a complex is formed at 25 mole percent uracil at 25° C. This complex is stable for hours. After 24 hours the complex is transformed into an apparent 37 mole percent uracil complex. In 0.003 M Na$^+$, pH 7.0, the 37 percent complex forms rapidly and is stable over long periods of time. As the Na$^+$ concentration is increased the apparent mole percent uracil in the complex shifts toward 50 percent. At pH 7.4 in 0.01 M tris buffer, 0.01 M Na$^+$, a 50 percent uracil complex forms. In 0.1 M Na$^+$ at pH 7.4 the 50 percent complex is maintained. The melting temperature of the 50 percent complex in 0.1 M Na$^+$ is 53° C. and 0.01 M Na$^+$ the complex melts at 43° C. The fact that poly-9-vinyladenine complexes with polyribonnucleic acid has been reported by others, see Kondo et al., Makromol, Chemic. 125 42 (1969).

The polymers of this invention would also appear to be useful for the preparation of complexes with the polynucleotides such as poly A, poly G, poly C and/or poly I.

As already indicated poly-9-vinyladenine is also useful as a thermally stable coating and is particularly useful for the production of water-soluble thermally stable coatings and films. Coatings and films of poly-9-vinyladenine can usually be prepared by casting from aqueous solutions containing the polymer. The polymer adheres well to substrates and particularly well to glass. The polymer screens out ultraviolet radiation and is transparent to visible light. The polymer is therefore useful as a coating for glass surfaces, such as windows.

Another embodiment of this invention is directed to the preparation of 1-vinyluracil and polymers thereof. 1-vinyluracil VII was prepared by a modification of the Hilbert Johnson reaction, Birkofer et al., Chem. Int. Edit., 4, 417 (1965), see also Nishimura et al. Chem. Pharm. Bull., 12, 352 (1964), wherein bis(trimethylsilyl)uracil V was heated in a sealed tube with 1,2-dichloroethane for 2 days at 110° C. to yield 1,(2,-chlorethyl)uracil VI, melting point 162°–163° C. (toluene) in 9 percent yield. Although the product yield of 1-vinyluracil was low the recovered uracil could be recycled in the synthesis. The chloro compound VI was dehydrohalogenated with an excess of potassium t-butoxide in tetrahydrofuran at 25° C. After recrystallization from water and then from toluene 1-vinyluracil VII melting point 181°–182°C. in 42 percent yield was obtained.

The general equation and reaction involved is set forth in accompanying equation No. 3.

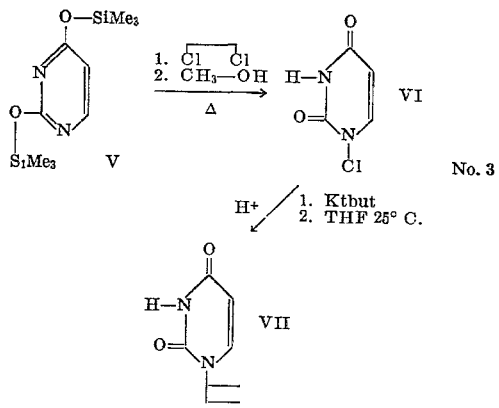

Another procedure for the preparation of 1-vinyluracil involves the general ring closure procedure of Shaw & Warrener, see Shaw et al., J. Chem. Soc., 157 (1958). In this procedure β-ethoxy acryloyl chloride VIII was converted into β-ethoxy acrylomide IX by treatment with ammonia. Then, using the general urea synthesis of Murdock and Angier, see Murdock et al., J. Org. Chem. 27, 3317 (1962). Vinyl-isocyanate was heated with the β-ethoxy acrylamide IX in a sealed tube to give N,β-ethoxy acryl-N-vinylurea X, melting point 145° C. Cyclization of this compound in aqueous ethanolic sodium hydroxide followed by chromatography on silicic yielded 1-vinyluracil VII in 20 percent yield.

The general equation and reaction involved is set forth in equation No. 4.

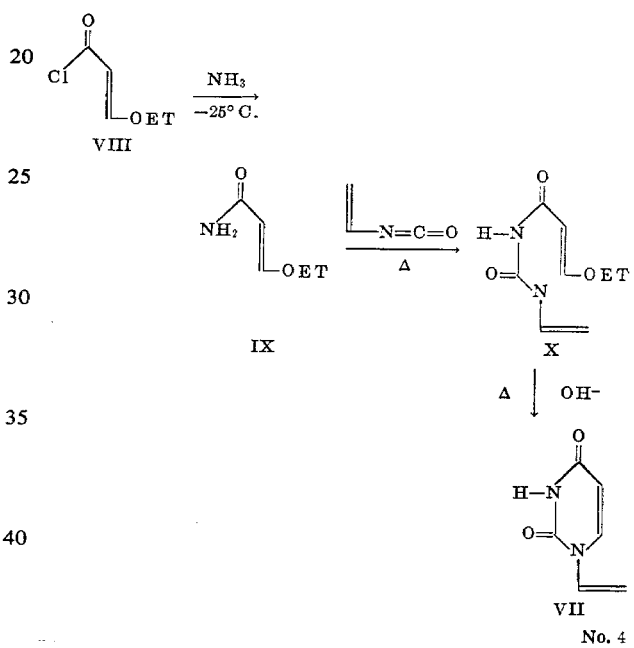

As will be apparent to those skilled in the art in the light of the foregoing disclosure, many substitutions, modifications and alternations are possible in the practice of this invention without departing from the spirit or scope thereof.

I claim:

1. A homopoly-9-vinyl-substituted purine.
2. A homopoly-9-vinyl-substituted purine selected from the group consisting of poly-9-vinyl-substituted guanine, poly-9-vinyl-substituted xanthine, poly-9-vinyl-substituted adenine, poly-9-vinyl-substituted hypoxanthine, poly-9-vinyl-substituted uric acid, poly-9-vinyl-substituted isoguanine, poly-9-vinyl-substituted 6-methyl isoguanine and poly-9-vinyl-substituted dimethyl guanine.
3. Poly-9-vinyladenine.
4. Film-form poly-9-vinyladenine.
5. A composition comprising an aqueous solution of poly-9-vinyladenine.
6. A method of preparing poly-9-vinyladenine which comprises polymerizing 9-vinyl-adenine in the presence of potassium persulfate as a polymerization initiator in an aqueous solution containing a minor amount of 9-vinyladenine, the polymerization being carried out at a temperature in the range from about 70°–100° C. and recovering the resulting poly-9-vinyladenine.
7. A method in accordance with claim 6 wherein the concentration of 9-vinyladenine in said aqueous solution is in the range 0.2–10 percent by weight.

* * * * *

UNITED STATES PATENT OFFICE
CERTIFICATE OF CORRECTION

Patent No. 3,664,991              Dated May 23, 1972

Inventor(s) HOWARD KAYE

It is certified that error appears in the above-identified patent and that said Letters Patent are hereby corrected as shown below:

Column 4, the formula should read as follows:

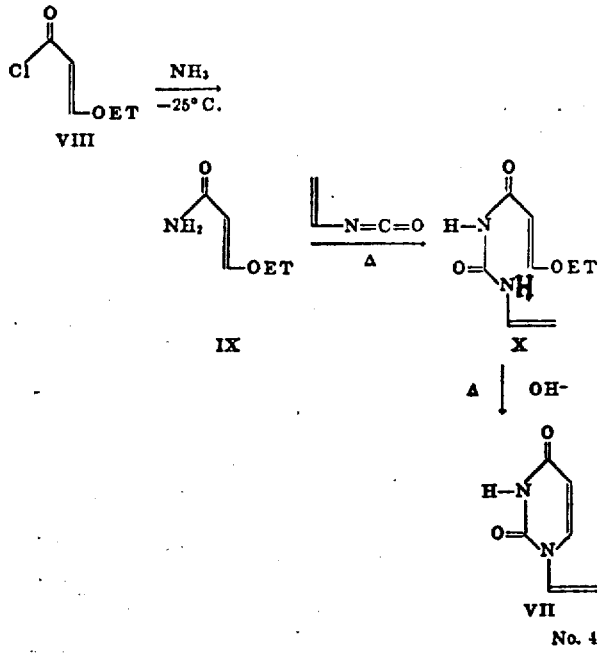

Column 4, in Claim 6, line 6, "70°-100°C." should correctly read -- 70°-110°C. --.

Signed and Sealed this

Twenty-first Day of September 1976

[SEAL]

Attest:

RUTH C. MASON  
Attesting Officer

C. MARSHALL DANN  
Commissioner of Patents and Trademarks